United States Patent
Stoianov et al.

(10) Patent No.: US 11,078,650 B2
(45) Date of Patent: Aug. 3, 2021

(54) MANAGEMENT OF LIQUID CONDUIT SYSTEMS

(71) Applicant: IMPERIAL INNOVATIONS LIMITED, London (GB)

(72) Inventors: Ivan Stoianov, Greater London (GB); Edo Abraham, Greater London (GB); Filippo Pecci, Greater London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 196 days.

(21) Appl. No.: 16/061,276

(22) PCT Filed: Dec. 21, 2016

(86) PCT No.: PCT/GB2016/054026
§ 371 (c)(1),
(2) Date: Jun. 11, 2018

(87) PCT Pub. No.: WO2017/109492
PCT Pub. Date: Jun. 29, 2017

(65) Prior Publication Data
US 2018/0355589 A1 Dec. 13, 2018

(30) Foreign Application Priority Data

Dec. 21, 2015 (GB) ...................... 1522553

(51) Int. Cl.
*E03B 7/07* (2006.01)
*G05D 16/20* (2006.01)
*E03B 7/02* (2006.01)

(52) U.S. Cl.
CPC ............... *E03B 7/071* (2013.01); *E03B 7/02* (2013.01); *E03B 7/075* (2013.01);
(Continued)

(58) Field of Classification Search
CPC ... E03B 1/02; E03B 7/02; E03B 7/075; E03B 1/00; E03B 7/00; E03B 7/07;
(Continued)

(56) References Cited

U.S. PATENT DOCUMENTS

| | | | | | |
|---|---|---|---|---|---|
| 4,180,083 | A | * | 12/1979 | Miyaoka | H02J 15/003 137/101.25 |
| 4,200,911 | A | * | 4/1980 | Matsumoto | E03B 7/02 137/119.06 |

(Continued)

OTHER PUBLICATIONS

Nicolini et al. (Optimal Location and Control of Pressure Reducing Valves in Water Networks) (Year: 2009).*
(Continued)

*Primary Examiner* — Darrin D Dunn
(74) *Attorney, Agent, or Firm* — Dorsey & Whitney LLP

(57) ABSTRACT

A method for controlling conditions within a liquid conduit system. The method comprising: defining a zone within the liquid conduit system, wherein pressure within the zone is influenced by one or more actuator valves; controlling the one or more actuator valves in dependence on a Pareto efficient solution to the minimisation of functions of the average pressure within the zone (AZP) and the pressure variability within the zone (PVZ).

17 Claims, 3 Drawing Sheets

(52) U.S. Cl.
CPC ....... *G05D 16/2026* (2013.01); *G05D 16/204* (2013.01); *G05D 16/2066* (2013.01); *Y02A 20/15* (2018.01)

(58) Field of Classification Search
CPC .. G06Q 10/04; G06Q 10/043; G06Q 10/0639; G05B 13/041; G05B 19/41855; G05B 2219/25232; G05B 2219/31094; G05B 2219/31324; G05B 2219/41273; G05B 23/0232; G05B 23/0254; G06F 2113/14; G06F 2111/10; G06F 30/18; G06F 17/18; G06F 17/00; G06F 17/10; Y10T 137/0396; Y10T 137/7762; Y10T 137/402; Y10T 137/776; F24D 19/1036; F24D 19/0095; F24D 2220/0264
See application file for complete search history.

(56) References Cited

U.S. PATENT DOCUMENTS

| | | | | | |
|---|---|---|---|---|---|
| 4,562,552 | A | * | 12/1985 | Miyaoka | E03B 7/02 137/255 |
| 4,888,706 | A | * | 12/1989 | Rush | G01F 1/00 700/283 |
| 4,934,399 | A | * | 6/1990 | Cho | G05D 16/2013 137/14 |
| 5,592,397 | A | * | 1/1997 | Shinoaki | G06F 30/18 702/47 |
| 5,813,226 | A | * | 9/1998 | Krone | E02F 9/2296 60/327 |
| 6,155,790 | A | * | 12/2000 | Pyotsia | F04B 49/20 417/28 |
| 6,199,378 | B1 | * | 3/2001 | Aardema | F15B 11/006 60/468 |
| 6,267,298 | B1 | * | 7/2001 | Campbell | A01G 25/16 239/70 |
| 6,516,249 | B1 | * | 2/2003 | Hoyle | F04B 49/065 700/282 |
| 6,626,042 | B2 | * | 9/2003 | Havlena | G01F 1/34 367/81 |
| 6,829,566 | B2 | * | 12/2004 | Sage | G06F 30/13 702/183 |
| 7,044,156 | B2 | * | 5/2006 | Webster | F16K 17/02 137/488 |
| 7,201,180 | B2 | * | 4/2007 | Ephrat | G05D 16/2086 137/14 |
| 7,337,022 | B2 | * | 2/2008 | Wojsznis | G05B 11/32 700/36 |
| 7,457,735 | B2 | * | 11/2008 | Wu | G06N 3/126 703/9 |
| 7,561,928 | B2 | * | 7/2009 | Peureux | F17D 1/04 700/28 |
| 7,643,974 | B2 | * | 1/2010 | Harper | G06N 3/126 703/7 |
| 7,647,136 | B2 | * | 1/2010 | McDowell | F17D 3/01 700/282 |
| 7,768,146 | B2 | * | 8/2010 | Balzano | F03B 13/00 290/43 |
| 8,051,875 | B2 | * | 11/2011 | Edwards | F16K 17/02 137/461 |
| 8,065,110 | B2 | * | 11/2011 | Golinveaux | G06G 7/50 702/181 |
| 8,109,289 | B2 | * | 2/2012 | Trnka | F24D 19/1015 137/487 |
| 8,191,795 | B2 | * | 6/2012 | Grimm | A01M 7/0089 239/1 |
| 8,612,189 | B2 | * | 12/2013 | Golinveaux | G06F 30/20 703/6 |
| 8,958,922 | B2 | * | 2/2015 | Blank | G05B 15/02 700/282 |
| 9,081,389 | B2 | * | 7/2015 | Foster | E03B 7/071 |
| 9,341,532 | B2 | * | 5/2016 | Challener | G01D 5/35312 |
| 9,405,297 | B2 | * | 8/2016 | Kallesoe | F04D 13/14 |
| 9,563,207 | B2 | * | 2/2017 | Aughton | G05D 7/067 |
| 9,576,081 | B2 | * | 2/2017 | Sambur | G06F 30/18 |
| 9,582,775 | B2 | * | 2/2017 | Ba | G06F 30/13 |
| 9,644,349 | B2 | * | 5/2017 | Burrows | E03B 1/00 |
| 9,658,628 | B2 | * | 5/2017 | Burt | G05D 23/1919 |
| 9,864,383 | B2 | * | 1/2018 | Reider | G05B 15/02 |
| 10,019,539 | B2 | * | 7/2018 | Vitaletti | G06Q 10/04 |
| 10,030,818 | B2 | * | 7/2018 | Hoskins | G01F 1/00 |
| 10,241,480 | B2 | * | 3/2019 | Fontana | G05B 15/02 |
| 10,443,217 | B2 | * | 10/2019 | Allmaras | G05B 17/02 |
| 2002/0002425 | A1 | * | 1/2002 | Dossey | G01F 1/44 700/284 |
| 2002/0117214 | A1 | * | 8/2002 | Tucker | G05D 16/2053 137/487.5 |
| 2004/0261857 | A1 | * | 12/2004 | Webster | F16K 17/02 137/487.5 |
| 2005/0199286 | A1 | * | 9/2005 | Appleford | F17D 3/00 137/487.5 |
| 2006/0271210 | A1 | | 11/2006 | Subbu et al. | |
| 2007/0220918 | A1 | | 9/2007 | Scharf et al. | |
| 2007/0284293 | A1 | * | 12/2007 | Pitchford | G01D 4/004 210/85 |
| 2008/0097637 | A1 | * | 4/2008 | Nguyen | G05B 17/02 700/110 |
| 2010/0032492 | A1 | * | 2/2010 | Grimm | A01M 7/0089 239/1 |
| 2010/0147394 | A1 | * | 6/2010 | Trnka | F24D 19/1015 137/12 |
| 2010/0168927 | A1 | * | 7/2010 | Burrows | E03B 1/00 700/282 |
| 2010/0217443 | A1 | * | 8/2010 | Hagler | F16K 5/0647 700/282 |
| 2011/0178644 | A1 | * | 7/2011 | Picton | E03B 7/071 700/282 |
| 2011/0191267 | A1 | * | 8/2011 | Savic | E03B 7/02 705/412 |
| 2011/0290329 | A1 | * | 12/2011 | Garza | E02B 3/00 137/2 |
| 2011/0290331 | A1 | * | 12/2011 | Burrows | E03B 7/02 137/14 |
| 2013/0204587 | A1 | * | 8/2013 | Cheng | G06F 30/367 703/2 |
| 2013/0211797 | A1 | * | 8/2013 | Scolnicov | G06Q 10/0639 703/2 |
| 2013/0289781 | A1 | * | 10/2013 | Kallesoe | F04D 13/14 700/282 |
| 2014/0052421 | A1 | * | 2/2014 | Allen | G06F 30/20 703/2 |
| 2014/0261714 | A1 | * | 9/2014 | Burt | G05D 23/1919 137/10 |
| 2014/0332088 | A1 | * | 11/2014 | Senesh | E03B 1/02 137/14 |
| 2014/0358499 | A1 | * | 12/2014 | Sambur | E03B 1/02 703/2 |
| 2014/0379143 | A1 | * | 12/2014 | Aughton | G05D 7/067 700/282 |
| 2015/0075655 | A1 | * | 3/2015 | Otarola Olguin | G05D 7/0647 137/601.14 |
| 2015/0308627 | A1 | * | 10/2015 | Hoskins | G01F 1/00 702/45 |
| 2015/0355618 | A1 | * | 12/2015 | Sharma | G05B 17/02 700/291 |
| 2016/0005119 | A1 | * | 1/2016 | Vitaletti | G06Q 40/04 705/37 |
| 2016/0098037 | A1 | * | 4/2016 | Zornio | H04L 41/0803 700/20 |
| 2016/0103452 | A1 | * | 4/2016 | Kang | G05D 7/0635 700/282 |
| 2016/0139607 | A1 | * | 5/2016 | Hamann | C02F 1/006 700/282 |
| 2016/0157443 | A1 | * | 6/2016 | Bermudez Rodriguez | A01G 25/165 239/11 |
| 2016/0209851 | A1 | * | 7/2016 | Aughton | G06F 17/00 |
| 2016/0291608 | A1 | * | 10/2016 | Reider | G05B 15/02 |

(56) References Cited

U.S. PATENT DOCUMENTS

| | | | | |
|---|---|---|---|---|
| 2016/0324084 | A1* | 11/2016 | Whalley | A01G 25/16 |
| 2017/0023919 | A1* | 1/2017 | Breyfogle | G05B 23/0232 |
| 2017/0037604 | A1* | 2/2017 | Allmaras | G05B 19/042 |
| 2017/0075365 | A1* | 3/2017 | Tarantino | G05B 15/02 |
| 2017/0103149 | A1* | 4/2017 | Ba | G06Q 10/06 |
| 2017/0132338 | A1* | 5/2017 | Al Gahtani | G06F 30/20 |
| 2018/0045355 | A1* | 2/2018 | Barden | F16L 55/07 |
| 2018/0045599 | A1* | 2/2018 | Larach | G01M 3/28 |
| 2018/0088601 | A1* | 3/2018 | Fontana | G05B 15/02 |
| 2018/0113481 | A1* | 4/2018 | Faiczak | G05D 16/2066 |
| 2018/0224314 | A1* | 8/2018 | Yoshida | G08B 21/182 |
| 2018/0356772 | A1* | 12/2018 | Cembrano | G05B 11/32 |
| 2019/0010681 | A1* | 1/2019 | Shi | E03B 7/04 |

OTHER PUBLICATIONS

Franco (A mixed-integer LP model for the optimal allocation of voltage regulatorsand capacitors in radial distribution systems, 2013) (Year: 2013).*

Renaud et al. Comparative study of different methods to assess average pressures in water distribution zones, 2012). (Year: 2012).*

International Search Report and Written Opinion for PCT/GB2016/054026, dated Mar. 9, 2017, 14 pages.

GB Search Report for GB1522553.5, dated Jun. 9, 2016, 6 pages.

Filippo et al., "Mathematical Programming Methods for Pressure Management in Water Distribution System", Procedia Engineering 119, Sep. 1, 2015, 10 pages.

Khedr et al., "Water Distribution System Calibration: Manual versus Optimization-Based Approach", Procedia Engineering 119, Sep. 1, 2015, 9 pages.

* cited by examiner

MANAGEMENT OF LIQUID CONDUIT SYSTEMS

CROSS-REFERENCE TO RELATED APPLICATIONS

This application is the national stage application of International Patent Application No. PCT/GB2016/054026, filed on Dec. 21, 2016, and entitled "Management of Liquid Conduit Systems", which claims priority to GB Patent Application No. 1522553.5, filed on Dec. 21, 2015, and entitled "Management of Liquid Conduit Systems", the entire contents of which are hereby incorporated by reference herein in their entireties for all purposes.

FIELD

The present disclosure relates to controlling hydraulic conditions within a liquid conduit system, such as a water distribution network. In particular, but not exclusively, the disclosure can provide a method and apparatus for increasing the resilience of a system, the reliability and life expectancy of individual assets and reducing the risk of failures.

BACKGROUND

The optimal operation of water distribution networks (WDNs) requires the satisfaction of multiple criteria, some of which may be conflicting, in order to meet increasing water demand in a cost efficient manner. Some objectives include the reduction of leakage, improvements in network resilience, increasing the reliability and life expectancy of critical assets, optimization of water quality, and the efficient use of energy in pumping.

The control of pressure has been employed to manage leakage. A decrease in the average pressure within WDNs has been shown to result in significant reductions in leakage and bursts. The sectorization of water distribution systems (the division into discrete supply areas) has also provided benefits in this respect. Networks are subdivided into smaller sectors as shown in FIG. 1, called District Metered Areas (DMAs). The installation of kept-shut isolating valves is done to construct sectors (areas) which have a single supply inlet (a single-feed from a water transmission main) so that flow into each DMA (and out of each DMA for cascading DMAs) is continuously monitored, improving the ability to manage pressure and consequently leakage. The sectorization of WDNs in single-feed sectors (DMAs) has led to the implementation of simplistic statistical based feedback control methods such as US 20110290331 A1. Such control methods rely upon the pressure measured at the hydraulically critical point (CP) within a DMA (sector).

The introduction of DMAs has severely reduced the redundancy in network connectivity, affecting system resilience and water quality negatively. Furthermore, the installation and operation of valves to sectorize the network and reduce the average zone pressure may generate high diurnal pressure variability within a supply network. This reflects the fact that demand is stochastic, the energy losses are non-linear and the hydraulic conditions within water supply systems are not steady state, although the design of the physical components within such systems and their respective simulation models often assume steady state flow conditions. In addition, hydraulic conditions within water distribution networks are frequently quasi-steady and unsteady due to a myriad of factors such as the operations of valves, pumps, malfunctioning surge protection devices, air valves, intermittency of supply, variations in demand and occasional bursts. The action of control valves to achieve desired average zone pressures as described above can contribute to this variability; and therefore, network operators require more advanced methods of model based control.

Current pressure control methods as described by US20110290331 A1 minimise pressure at a critical point in a network but introduce significant pressure variations in supply critical pipes (hydraulic links). Such pressure variations cause pressure-induced stress on high-consequence components of the distribution system, potentially accelerating deterioration mechanics and leading to failures. This outcome runs counter to the desired objective of current control systems for minimizing the average zone pressure. As a result, current control methods as described in US20110290331 A1 do not always present optimal solutions, as current control methods used to maintain minimum average zone pressures may lead to consequent intra- and inter-zone variations in pressure. The CP-based feedback control of current pressure management schemes may reduce the reliability and life expectancy of high-consequence assets.

There is therefore an ongoing need to improve the management of liquid conduit systems, such as water distribution networks, in order to increase efficiency and reliability, and thus offer improved cost effectiveness for the supply system as a whole.

Wright, R., Stoianov, I., et al. "Adaptive water distribution networks with dynamically reconfigurable topology." Journal of Hydroinformatics 16.6 (2014): 1280-1301 propose an alternative approach for managing sectorized water distribution networks. This new approach includes the adaptive aggregation of sectors by dynamically changing the network connectivity and topology. The dynamic network reconfiguration is achieved by the replacement of closed boundary valves with automatic control valves that modify the network topology and continuously monitor the dynamic hydraulic conditions (FIG. 2), resulting in multi-feed pressure control zones. The network is reversed to its original DMA topology during periods of low demand (i.e. 2 am-4 am) to monitor the minimum night flow within small discrete areas and maximise the management of leakage. The DMAs are then aggregated (i.e. 4 am-2 am) into larger multi-feed pressure controlled zones to maximise redundancy, reliability and resilience of supply while at the same time achieving improvements in pressure management due to smaller energy losses occurring in networks with additional connectivity. This model-based pressure control is unlike alternative approaches, where pressure is controlled simply by modulating (reducing) the output pressure of an automatic control valve based on a feedback pressure signal from a critical point (CP).

SUMMARY

According to a first aspect, there is provided a method for controlling conditions within a liquid conduit system, comprising:
  defining a zone within the liquid conduit system, wherein pressure within the zone is influenced by one or more actuator valves (for example, automatic control valves);
  controlling the one or more actuator valves in dependence on a Pareto efficient solution to the minimisation of functions of the average pressure within the zone (AZP:

average zone pressure) and the pressure variability within the zone (PVZ: pressure variability within the zone).

According to a second aspect, there is provided an apparatus for controlling a liquid conduit system comprising a zone containing one or more actuator valves, the apparatus comprising:

one or more processors configured to calculate a Pareto efficient solution to the minimisation of functions of the average pressure within the zone and the pressure variability within the zone and configured to control the one or more actuator valves in dependence on the Pareto efficient solution.

By adopting Pareto efficient solutions for the control of actuator valves it can be ensured that both the average zone pressure (AZP) and pressure variability (PVZ) are taken into account, thereby avoiding unnecessary excesses in either variable and/or allowing the operator to select optimal trade-offs between these variables. The actuator valves may be controlled to comply with the Pareto efficient solution. By managing and reducing the values of both variables, reductions in both assets degradation and leakage within the liquid conduit system may be achieved.

Pareto efficient solutions are those that are not "dominated" by any other possible approach, where to be dominated implies that there is another feasible solution which improves one objective without causing another to become worse.

As a consequence, an effective pressure management is provided which can consider both the minimization of average zone pressure (AZP) and pressure variability (PVZ). Pressure management for both single and multi-feed systems (i.e. systems with sectors that have multiple inflows as shown in FIG. 2) can be provided by considering both the minimization of AZP and PVZ simultaneously. The pressure control can be actuated by inlet control valves, which modulate the pressure and flow at the inlet(s) to the zone(s), and boundary control valves, which modulate the pressure, flow and valve position including fully open, closed or anything in between the two at the boundaries between the sectors. In standard approaches and on rare occasions where multi-feed control zones are commissioned, these are installed and operated based on "trial and error" empirical knowledge with a high risk for sub-optimal hydraulic operation and failures. In contrast, the present disclosure proposes departing from the standard practice and considering the problem of optimizing the location of the actuators (i.e. inlet and boundary control valves), and the optimal pressure settings (AZP and PVZ) simultaneously—what is referred to as a co-design optimization problem. Note that once the co-design multiobjective optimization problem is solved, different control schemes can be applied for the operational management of the optimally placed automatic control valves in different demand and application scenarios.

Controlling the actuator valves may comprise opening or closing the valves and modulating for pressure, flow and position. Their functions can change and may also comprise reducing and sustaining pressure. Furthermore, their phased commissioning can also be optimally planned with the proposed method.

In addition to controlling the actuator valves, their location may be chosen as dependent on the Pareto efficient solution. Choosing optimal valve placement locations may comprise selecting the actuator valves from a set of valves at various locations or designing the system itself to include valves at the desired locations, for example. As such, in some preferred embodiments, the location of the one or more actuator valves is selected based on the Pareto efficient solution to the minimisation of functions of the average pressure within the zone (AZP) and the pressure variability within the zone (PVZ). By allowing the location of the actuator valves to be selected in this way, improved solutions can be achieved.

The decision maker (network operator) can further refine and choose the preferred solution from the set of Pareto efficient solutions (Pareto frontier) according to a plurality of criteria which may not be possible to formalise in mathematical terms. These preferences include, but are not limited to, the following:

Impact of traffic on the installation locations (ease of installation and maintenance).

Permission from local government to execute the installation.

Risk of damage to other infrastructure already installed at a particular location.

Ease of accessibility of a particular location.

Operational risk associated with the area of a particular location.

Additional preferences based on operators' knowledge.

Preferably, the zone comprises a plurality of conduits, each conduit being provided with a weighting which impacts the recommended amplitude of pressure variability. In this manner, conduits (such as pipes) for which it is particularly desirable to minimise pressure variability may be given a greater weighting than others. For example, the weighting may be generated based on the criticality of the conduits (consequence of failure) and/or the vulnerability of the conduits. Criticality may reflect the number of people reliant upon a particular conduit or the purpose it serves (such as supply to a hospital or school), for instance. Vulnerability may reflect the conduit's current condition and its likelihood and consequence of failure, and factors may include the conduit's age, material type, environmental conditions, internal and external loads that affect pipe failure mechanisms.

The weighting may also take into account additional objective functions such as cost of installation for each candidate location and/or TOTEX (total expenditure) cost related indicators, etc.

In a preferred approach, the Pareto efficient solution is obtained solving a series of single-objective mixed integer non-linear programs. It has been found that this approach can offer a computationally efficient technique to obtain Pareto efficient solutions to the multi-objective problem associated with both average zone pressure (AZP) and pressure variability (PVZ).

Preferably, the function of average pressure within the zone is formulated as a weighted sum of nodal pressures within the zone, where weights represent the lengths of conduit connected to corresponding nodes. This function allows ready computation of the average zone pressure and may enable ready monitoring of such pressures using sensors placed at one or more nodes.

In some preferred embodiments, the Pareto efficient solutions are obtained using evolutionary approaches based on genetic algorithms (GA). Results from GA can, for example, be used to compute good initial conditions for the preferred mathematical methods.

It can also be appreciated that the invention can be implemented using computer program code. Indeed, according to a further aspect there is therefore provided a computer program product comprising computer executable instructions for carrying out the method of the first aspect. The computer program product may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer or a distributed low power embedded systems configured to carry out the method described above.

Other optional features are defined in the dependent claims in the appended claim set.

BRIEF DESCRIPTION OF THE FIGURES

A preferred embodiment of the present disclosure will now be described with reference to the accompanying drawings, in which:

FIGS. 1 and 2 schematically illustrate the adaptive sectorization of water distribution networks with dynamically reconfigurable topology, in which: FIG. 1 shows the segregation of a supply zone into DMAs for leakage detection during a period of low demand (2 am-4 am);

FIG. 2 shows aggregation of DMAs into large pressure management zones (4 am-2 am) for improved resilience and pressure management; and, FIG. 3 shows a process for calculating the control profiles and locations for each automatic control valve to achieve the desired minimization of average pressure and pressure variability which constitute the cumulative pressure induced stress for a specific asset (pipe, etc) or a zone. This model based control method is done for either of these network topology settings (single and multi-feed zones).

DETAILED DESCRIPTION

Figure 1:
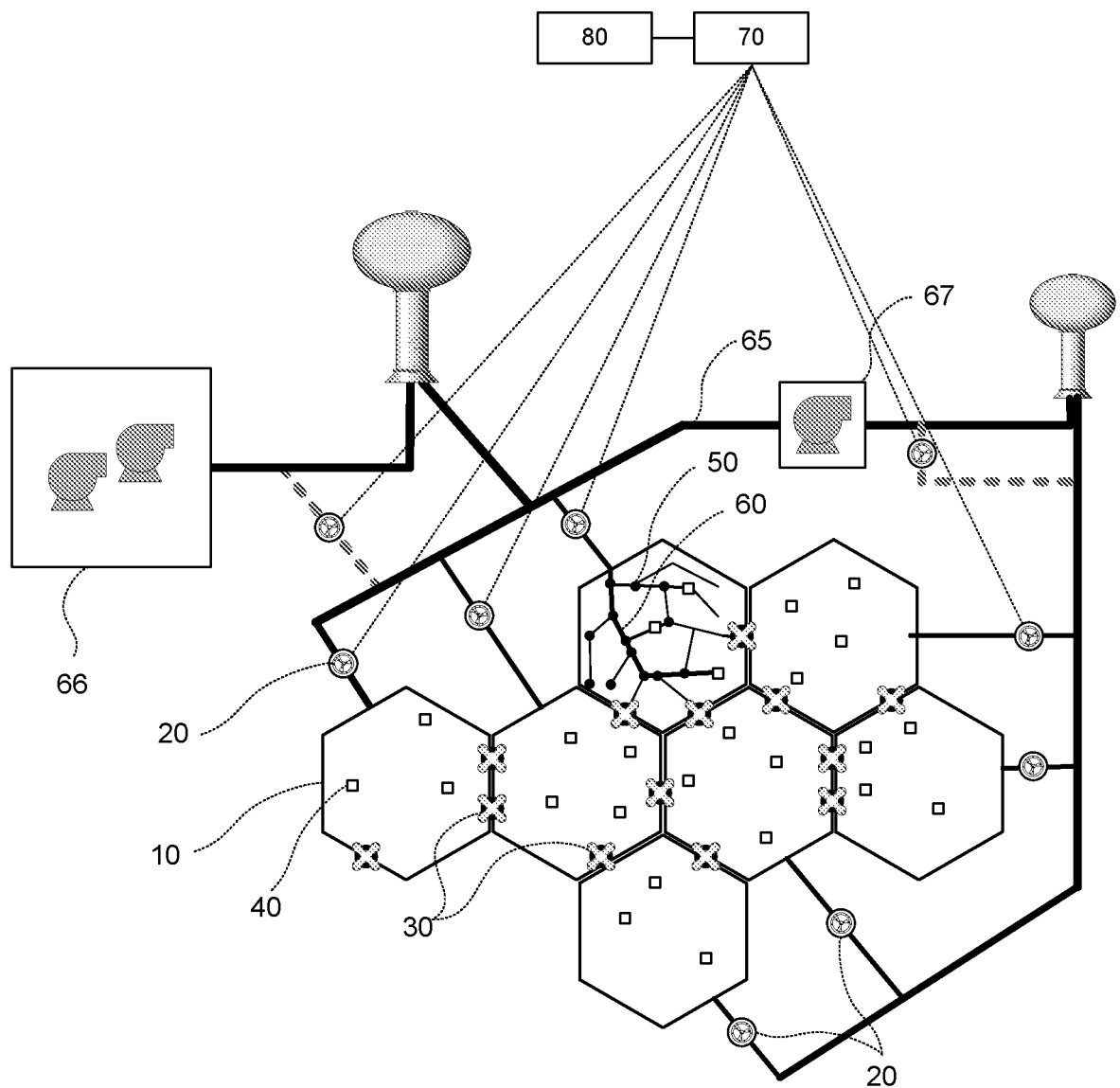
Figure 2:
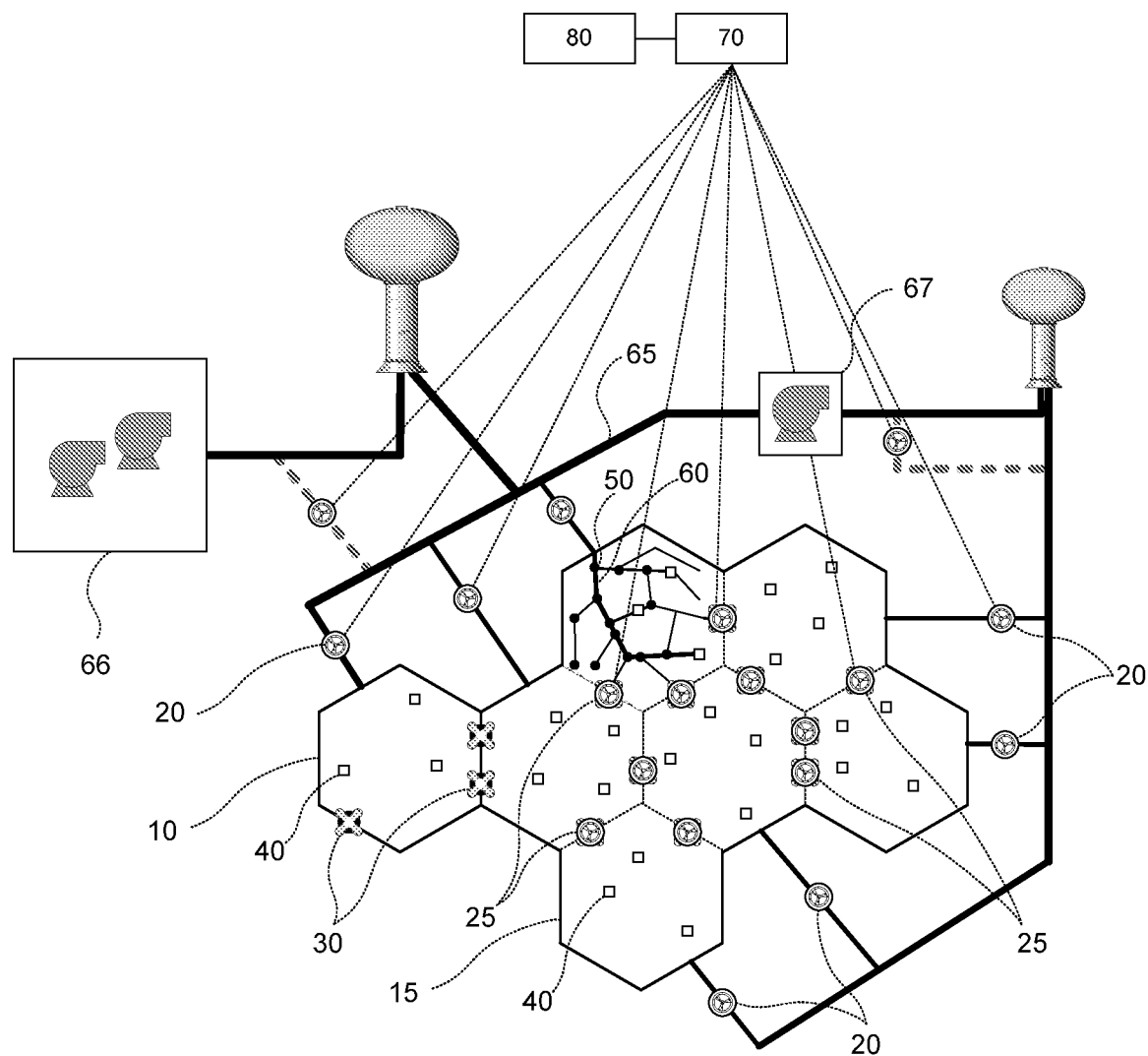

Referring to FIGS. 1 and 2, two alternative topologies of a water distribution network (WDN) are shown comprising a plurality of single feed zones 10 (FIG. 1) and/or a multi-feed zones 15 (FIG. 2). The WDN is an example of a liquid conduit system. Within each zone 10 and 15, a plurality of pipes 60 act as conduits to connect nodes 50. Also provided are inlet control valves 20, boundary control valves 25 and kept-shut boundary valves 30. The inlet actuator valves 20 may control fluid flow, pressure and valve position and may comprise valves located at the inlet/s into the zone. An inlet into a zone is generally defined as a supply feed from a transmission main. The boundary control valves 25 may also control in dual-direction the fluid flow, pressure and valve position and may comprise valves located within and at the boundaries of the zone with other zones. The actuator valves 20 and 25 may control liquid flow and pressure within the system together with optimal settings of pumps and reservoirs. A plurality of sensors 40 may also be provided to monitor pressure within the system.

The actuator valves may be connected to a communications network 70. The communications network may enable control of the actuator valves by control apparatus 80, which can be remotely located. The control apparatus 80 may comprise one or more processors arranged to control the actuator valves 20 and 25 and zonal pumps 66 and booster pumps 67 to perform the method described below in order to obtain Pareto efficient solutions. In this way, the pressure characteristics of a zone that include both the average zone pressure and pressure variability within the water distribution network may be controlled.

Accordingly, optimal pressure management can be achieved by controlling the actuator valves, which regulate the pressure and flow at the inlets to the zone/s, and boundary valves which can also modulate for flow, pressure and valve position (fully open, closed or anything in between the two). The actuator valves can provide a dual directional control. As well as controlling the actuator valves once installed, the location of the actuator valves (i.e. inlet control valves and boundary control valves which may include pressure reducing and/or sustaining valves) may also be optimised. The locations and the optimal pressure settings may be considered simultaneously. This establishes a co-design optimization problem. Once the co-design multi-objective optimization problem is solved, different control schemes can be applied for deriving the operational control settings of the optimal placed control valves in different operational scenarios.

The mathematical formulation for the simultaneous optimal design and control problem presents significant challenges. It requires the solution of a complex nonlinear optimization problem with both continuous and discrete variables. In the present embodiment, nodal pressures, pipe flows and valve locations are considered as decision variables, where binary variables are needed to model the placement of valves. In addition, the inclusion of hydraulic conservation laws results in non-convex, nonlinear constraints.

The co-design problem is addressed with respect to two objectives, i.e. the minimization of average zone pressure (AZP) and pressure variability (PVZ) via the optimal placement and control of valves. Therefore, a multi-objective optimization problem is formulated to establish the trade-offs between these two criteria. The resulting problem is a non-convex multi-objective mixed integer nonlinear program (MI NLP).

Although the natural aspiration is to find a feasible optimal configuration for all the objectives, typically no single solution that simultaneously optimises all conflicting objectives exists. Therefore, the mathematical notion of Pareto optimality is adopted to characterise the best compromises between conflicting objectives. A feasible point for the multiobjective optimization analysis is called "not-dominated" (and consequently do lie on the Pareto Frontier) if there is no other feasible point that improves one or more of the objectives without making any other worse. The not-dominated feasible points define the Pareto Frontier.

While multiobjective co-design optimization problems for water distribution networks may be studied using evolutionary algorithms (EAs), which can be easy to implement by coupling them with simulation software, EAs have disadvantages. Firstly, they do not guarantee optimality of the solutions, not even local optimality. Secondly, a large number of function evaluations and simulations of the hydraulic model are required in order to generate useful solutions, which do not scale well with the size of the search space. Unlike mathematical optimization approaches, evolutionary methods do not explicitly or accurately handle nonlinear constraints. Since optimal control profiles for pressure management need to satisfy strict physical, quality and economic constraints, it is desirable to obtain a method that guarantees an accurate handling of constraints. Moreover, it is preferable to adopt a scalable approach for large scale water systems, which may exploit the particular sparse structure of water distribution networks.

Therefore, the preferred embodiment adopts a different approach, focusing on techniques which approximate the image of the Pareto set through the objective functions, called Pareto frontier or front. The aim is to provide a wide and uniform distribution of points of the front so that the decision maker (network operator) can choose the Pareto optimal solution which better fits its needs. This is an a posteriori approach since the articulation of the preferences by the decision maker is made after the generation of the approximated Pareto front. Common a posteriori approaches include scalarization methods (such as those described in, for example: Marler, R. T. & Arora, J. S., 2004. Survey of multi-objective optimization methods for engineering. Structural and Multidisciplinary Optimization, 26(6), pp. 369-395; Das, I. & Dennis, J. E., 1998. Normal-Boundary Intersection: A New Method for Generating the Pareto Surface in Nonlinear Multicriteria Optimization Problems. SIAM Journal on Optimization, 8(3), pp. 631-657; Messac, A., Ismail-Yahaya, A. & Mattson, C. A., 2003. The normalized normal constraint method for generating the Pareto frontier. Structural and Multidisciplinary Optimization, 25(2), pp. 86-98; and Kim, I. Y. & De Weck, O. L., 2005. Adaptive weighted-sum method for bi-objective optimization: Pareto front generation. Structural and Multidisciplinary Optimization, 29(2), pp. 149-158).

These methods parameterize the multi-objective problem into a series of single-objective optimization problems that can be solved using standard nonlinear programming techniques. A popular scalarization method is the weighted sum (WS) of the objectives. Despite its simplicity, some disadvantages of the WS approach include its inability to generate Pareto points in the non-convex parts of the Pareto front and the fact that an even spread of weights may not correspond an uniform distribution of points of the front (see, for example, Das, I. & Dennis, J. E., 1997. A closer look at drawbacks of minimizing weighted sums of objectives for Pareto set generation in multicriteria optimization problems; Structural Optimization, 14(1), pp. 63-69). In the last 20 years new methods have been proposed to deal with these drawbacks, in particular, the Normal Boundary Intersection (NBI) method (see, for example Das, I. & Dennis, J. E., 1998. Normal-Boundary Intersection: A New Method for Generating the Pareto Surface in Nonlinear Multicriteria Optimization Problems. SIAM Journal on Optimization, 8(3), pp. 631-657) and the Normalized Normal Constraint (NNC) method (see, for example, Messac, A., Ismail-Yahaya, A. & Mattson, C. A., 2003. The normalized normal constraint method for generating the Pareto frontier. Structural and Multidisciplinary Optimization, 25(2), pp. 86-98). These methods can be combined with efficient gradient-based algorithms to find optimal solutions even for large-scale and highly constrained optimization problems.

So, the preferred embodiment adopts an approach designed to minimise average zone pressure (AZP) and pressure variability (PVZ) within the zones 10 and 15 (FIG. 2). The approach adopted is described in more detail below.

1 Average Zone Pressure

Average zone pressure (AZP) according to the preferred embodiment is formulated as the weighted sum of nodal pressure, where weights represent the lengths of pipes connected to the corresponding nodes, and can be expressed using the weighted sum:

$$\mu_1(x) := \frac{1}{A} \sum_{k=1}^{n_l} \sum_{i=1}^{n_n} \alpha_i p_i^k \quad (1)$$

where $$\alpha_i := \sum_{j \in I(i)} \frac{L_j}{2}$$

and I(i) is the set of indices for pipes incident at node i counted only once.

The normalization factor $A = \sum_{i=1}^{n_n} \alpha_i$ is chosen so that, for each time step, $$\frac{1}{A} \sum_{i=1}^{n_n} \alpha_i p_i^k$$

is a convex combination of pressures.

2 Pressure Variability

Pressure variability (PVZ) in the preferred embodiment can be expressed as:

$$\mu_V(x) := \sum_{i=1}^{n_n} w_i (p_i^1 - p_{i_l}^{n_l})^2 + \sum_{i=1}^{n_n} w_i \left( \sum_{k=2}^{n_l} (p_i^k - p_i^{k-1})^2 \right) \quad (2)$$

This function encodes pressure variability indicators that have been linked with pipe failures and cumulative pressure induced stress. The function in (2) is a quadratic form and can be written as $x^T Q x$, with $Q \in \mathbb{R}^{N \times N}$ symmetric positive semidefinite.

Moreover, since the quadratic form only depends on pressure head values, we have that $x^T Q x = p^T Q_p p$ with $p = [p^1, \ldots, p^{n_l}]^T$ and $Q_p \in \mathbb{R}^{n_l n_n \times n_l n_n}$ symmetric positive semidefinite.

A preliminary numerical analysis on the considered optimization problem has shown that gradient-based nonlinear programming solvers perform better if at least matrix $Q_p$ is positive definite, hence we add a small regularization term $\delta > 0$ to the diagonals elements of $Q_p$ so that it becomes diagonal dominant and then positive defined. Let $\tilde{Q}_p := Q_p + \delta I_{n_l n_n}$ and $\tilde{Q}$ the matrix such that $x^T \tilde{Q} x = p^T \tilde{Q}_p p$. If the perturbation term is sufficiently small it will not significantly affect the optimization process. Finally, the second objective function used to account or pressure variability can be defined as $\mu_2(x) := x^T \tilde{Q} x$.

3 Risk Based Selection of Weights

In minimizing pressure variability across the network, it may be beneficial to consider both the relative criticality and vulnerability of pipes. This is because pipes that are vital in the provision of supply (e.g. pipes connecting important users like hospitals, schools etc. to water sources or have high-consequence of failure) and pipes which are vulnerable to pressure-induced failure (e.g. pipes that are relatively older and pipes with high likelihood of failure) can be prioritized to have lower pressure variations on them (see 60 in FIG. 2).

The framework in equations (1) and (2) above can treat the optimization of pressure variability across all pipes of a water distribution network equally by using weights all equal to 1 in (2). However, by appropriately choosing the weights based on pipe criticality (i.e. consequence of failure) and vulnerability (i.e. according to their likelihood of failure), the same proposed framework allows the decision maker to direct the optimization process more towards high risk pipes.

3.1 Critical Pipes

The criticality of a pipe can be defined based on the relative impact on the network if that pipe fails. One aspect of the impact relates to the number of customers affected by the interruption of supply in the failure (see 60 in FIG. 2). A second aspect relates to the type of customer affected; for example, an interruption of supply for a hospital may be less tolerated compared to an interruption of supply for an industrial user).

For a small network, critical pipes and their impact is measured through hydraulically simulating failures, i.e. using a critical link analysis. Such methods have combinatorial computational complexity, i.e. simulating cascading effects through different combinations of failures takes an infeasibly large amount of time for large and medium size models. In order to address this, preferred embodiments of this disclosure use scalable graph theory tools for automatically identifying most critical and high-risk pipes in the networks To identify pipes critical to the supply of important users (such as hospitals or schools, or other users important with respect to other social and economic criteria), the preferred embodiment adopts a hydraulic capacity (see, for example, Park, J. I., Lambert, J. H. & Haimes, Y. Y., 1998. Hydraulic power capacity of water distribution networks of deterioration. Water Resources Research, 34(12), pp. 3605-3614) weighted K-shortest path algorithm (see, for example, Eppstein, D., 1998. Finding the k shortest paths. SIAM Journal on Optimization, 28(2), pp. 652-673). In this approach, by restricting a weighted betweenness computation to paths connecting important nodes (e.g. hospitals) to water sources, the k-shortest paths between each such pair-wise nodes can be computed, and the number of times each pipe appears in such paths can be identified. The paths can be weighted by their hydraulic power capacities in the k-shortest path computations to introduce hydraulic meaning to each pipe's importance. The pipes that appear in all the paths with the highest hydraulic capacity can be deemed critical/important to supply. This may be done for all pairwise combination of sources and important nodes. The pipes that do not appear in the pairwise paths may not be considered critical. A set of weights can also be generated for each pipe based on these computations.

3.2 Vulnerable Pipes

The weighting may also take account of the vulnerability of the pipes. For example, special attention can be given to the pipes that are more vulnerable to failure under cumulative pressure variations (cumulative pressure induced stress). By automatically analysing the network geographical information system (GIS) data, pipes can be categorized by age, material type, location, and other factors. By assigning weights based on this, the optimization process can made to prevent large pressure variations on the most vulnerable of the critical pipes while still reducing the average zone pressure.

3.3 Risk Ranking

Using criticality and vulnerability rankings as described above, and overall risk ranking can be defined to establish the weighting for pipes within the network.

4 Solution Methods

Having defined the functions to be minimised, the referred embodiment adopts a scalable solution method for the considered non-convex multiobjective mixed-integer nonlinear problem thereby established. In particular, scalarization methods can be used to obtain the Pareto fronts. Techniques that can be adopted to generate the Pareto fronts include the methods mentioned above such as the Normal Boundary Intersection (NBI) method, the Normalized Normal Constraint (NNC) method and the Weighted Sum (WS) method. Each scalarization method addresses the generation of points on the Pareto front by solving a sequence of single-objective MINLPs.

4.1 Solution of Single-Objective MINLPs

A possible approach for non-convex MINLP is the application of a branch and bound algorithm to find at least local solutions. However, this would result in infeasible computational time for large scale water distribution networks, since it is necessary to solve a series of MINLPs to generate the Pareto front. Accordingly, in the preferred embodiment, an alternative approach is adopted.

Since the integer variables involved in our optimization problem are binaries, they can be reformulated as complementarity constraints, enforcing the variables to take only one of the two complementary values 0 and 1. The feasible set of mathematical programs with complementarity constraints (MPCCs) has a pathological structure that prevents the solution with direct application of standard nonlinear programming solvers. However, MPCCs have been successfully solved using specialized algorithms in other engineering frameworks.

The preferred embodiment may implement relaxation (such as that described in Raghunathan, A. U. & Biegler, L. T., 2005. An Interior Point Method for Mathematical Programs with Complementarity Constraints (MPCCs). SIAM Journal on Optimization, 15(3), pp. 720-750; or Hoheisel, T., Kanzow, C. & Schwartz, A., 2011. Theoretical and numerical comparison of relaxation methods for mathematical programs with complementarity constraints. Mathematical Programming, 137(1-2), pp. 257-288) and penalization methods (such as those described in: Hu, X. M. & Ralph, D., 2004. Convergence of a penalty method for mathematical programming with complementarity constraints. Journal of Optimization Theory and Applications, 123(2), pp. 365-390; Leyffer, S., López-Calva, G. & Nocedal, J., 2006. Interior Methods for Mathematical Programs with Complementarity Constraints. SIAM Journal on Optimization, 17(1), pp. 52-77; or Ralph, D. & Wright, S. J., 2004. Some properties of regularization and penalization schemes for MPECs. Optimization Methods and Software, 19(5), pp. 527-556.) for the solution of the MPCCs related to the considered co-design optimization problem. The former relies on the solution of a sequence of relaxed problems with 'regular' approximations for the complementarity constraints; these approximate feasibility sets are described using a relaxation parameter. The relaxed problems can be solved with standard NLP solvers. The relaxed feasible sets converge to the pathological feasibility set of the MPCC, hence the sequence of solutions will converge to a stationary solution of the original problem.

Alternatively to relaxation methods, the implementation of penalization methods may be adopted, where the optimization is performed in a feasible set obtained by dropping the complementarity constraints, which are then embedded into the objective function via a function that penalizes complementarity violations. A sequence of penalty problems can then be solved using standard NLP solvers and the solutions will converge to a stationary point of the original MPCC problem (Hu, X. M. & Ralph, D., 2004. Convergence of a penalty method for mathematical programming with complementarity constraints. Journal of Optimization Theory and Applications, 123(2), pp. 365-390). Moreover, sparse techniques can be used within the NLP solvers to improve the performance of relaxation and penalization methods since the large scale mixed integer nonlinear programs that arise in the framework of optimal co-design for water distribution networks have sparse constraints. The Jacobians and Hessians of relaxed and penalized NLPs retain this sparsity, which can be taken advantage of.

4.2 Overview of the Solution Method

Figure 3:
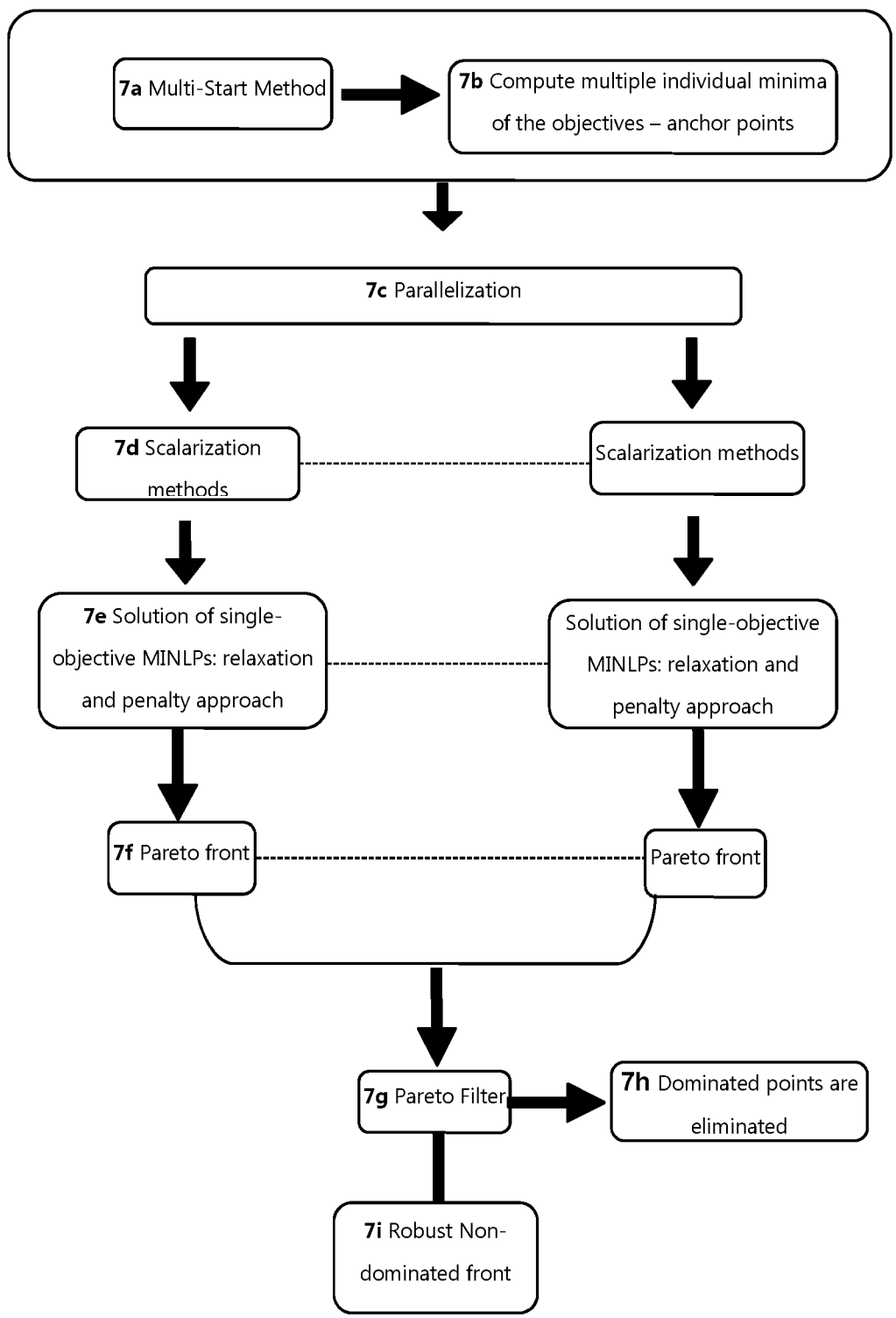

With reference to FIG. 3, the overall solution method can be understood as follows.

At step 7a, a multi-start technique is adopted. This allows the process to obtain, at step 7b, multiple different individual local minima (anchor points) for the two objectives (AZP and PVZ). In the next step 7c, a parallelization process is operated on multicore processors of multiple different runs of the scalarization methods, each of which is initialized by the plurality of anchor points generated at step 7b.

Step 7d then operates in parallel and allows the application of the user preferred or all scalarization methods mentioned above—NBI, NNC, WS. Subsequently, at step 7e the solution of the single-objective MINLPs generated by each instance of the scalarization method is computed. At step 7f, the Pareto front is composed from the identified instances. At step 7g a Pareto filter is applied to the different Pareto fronts generated by the previous steps in order to eliminate dominated points (step 7h); as a result at step 7i a robust non-dominated front can be generated.

The performance of the scalarization methods can be improved by using the information obtained from the solution of a single-objective problem to initialize the subsequent iteration. Relaxation and penalty methods require the solution of a series of sparse nonlinear programs (NLPs) which can be efficiently solved by a plurality of state-of-the-art sparse NLP solvers, implementing active-set or interior point algorithms.

Variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method for controlling pressure conditions within a liquid conduit system comprising
   defining a zone within the liquid conduit system, wherein pressure within the zone is influenced by one or more actuator valves;
     defining a first function to be minimised, the first function expressing the average pressure within the zone (AZP);
   defining a second function to be minimised, the second function expressing the pressure variability within the zone (PVZ);
   minimising the first and second functions;
   determining a Pareto efficient solution to a problem of optimal minimisation of both the first and second functions; and
   controlling the one or more actuator valves in dependence on the Pareto efficient solution.

2. A method according to claim 1, wherein one or more locations of the one or more actuator valves are selected in dependence on the Pareto efficient solution.

3. A method according to claim 1, wherein the zone comprises a plurality of conduits, and each conduit is represented by a weighting factor for constraining the second function.

4. A method according to claim 3, wherein the weighting factor is generated in dependence on a criticality risk-based parameter of the conduit.

5. A method according to claim 3, wherein the weighting factor is generated in dependence on a vulnerability risk-based parameter of the conduit.

6. A method according to claim 1, wherein the Pareto efficient solution is obtained using a series of single-objective mixed integer non-linear programs.

7. A method according to claim 1, wherein the Pareto efficient solution is obtained using a scalarization method.

8. A method according to claim 1, wherein the first function is formulated as a weighted sum of nodal pressures within the zone, where a respective weighting factor for each nodal pressure is representative of lengths of conduit connected to corresponding nodes.

9. A computer program product comprising computer executable instructions embodied in a non-transitory computer readable medium for carrying out the method of claim 1.

10. An apparatus for controlling a liquid conduit system comprising a zone containing one or more actuator valves, the apparatus comprising one or more processors configured to
    minimise a first function and a second function, wherein the first function expresses an average pressure within the zone (AZP) and the second function expresses a pressure variability within the zone (PVZ);
    calculate a Pareto efficient solution to a problem of optimal minimisation of both the first and second functions; and
    control the one or more actuator valves in dependence on the Pareto efficient solution.

11. An apparatus according to claim 10, wherein one or more of the locations of the one or more actuator valves are selected in dependence on the Pareto efficient solution.

12. An apparatus according to claim 10, wherein the zone comprises a plurality of conduits, a corresponding weighting factor is ascribed to each conduit, and each weighting factor is applied within the second function.

13. An apparatus according to claim 12, wherein the weighting factor is generated in dependence on a criticality risk-based parameter of the conduit.

14. An apparatus according to claim 12, wherein the weighting is generated in dependence on a vulnerability risk-based parameter of the conduit.

15. An apparatus according to claim 10, wherein the Pareto efficient solution is obtained using a series of single-objective mixed integer non-linear programs.

16. An apparatus according to claim 10, wherein the Pareto efficient solution is obtained using a scalarization method.

17. An apparatus according to claim 10, wherein the first function is formulated as a weighted sum of nodal pressures within the zone, where a respective weighting factor for each nodal pressure is representative of lengths of conduit connected to corresponding nodes.

* * * * *